US012766598B2

(12) United States Patent
Ramesh et al.

(10) Patent No.: US 12,766,598 B2
(45) Date of Patent: Oct. 20, 2026

(54) SYSTEM AND METHOD FOR CONTROLLING TEMPERATURE IN A THREE-DIMENSIONAL (3D) PRINTER

(71) Applicant: Additive Technologies, LLC, Palm City, FL (US)

(72) Inventors: Palghat S. Ramesh, Pittsford, NY (US); Viktor Sukhotskiy, Livermore, CA (US); Christopher T. Chungbin, Webster, NY (US); Paul J. McConville, Webster, NY (US); Peter M. Gulvin, Webster, NY (US); Gary D. Redding, Dansville, NY (US)

(73) Assignee: ADDITIVE TECHNOLOGIES, LLC, Palm City, FL (US)

( * ) Notice: Subject to any disclaimer, the term of this patent is extended or adjusted under 35 U.S.C. 154(b) by 110 days.

(21) Appl. No.: 17/653,138

(22) Filed: Mar. 2, 2022

(65) Prior Publication Data

US 2023/0278104 A1 Sep. 7, 2023

(51) Int. Cl.

| | |
|---|---|
| ***B22F 10/22*** | (2021.01) |
| ***B22D 23/00*** | (2006.01) |
| ***B22F 10/30*** | (2021.01) |
| ***B22F 12/53*** | (2021.01) |
| ***B33Y 10/00*** | (2015.01) |
| ***B33Y 30/00*** | (2015.01) |

(52) U.S. Cl.

CPC ............ *B22F 10/22* (2021.01); *B22D 23/003* (2013.01); *B22F 10/30* (2021.01); *B22F 12/53* (2021.01); *B33Y 10/00* (2014.12); *B33Y 30/00* (2014.12)

(58) Field of Classification Search

CPC ....................................................... B22F 10/22

See application file for complete search history.

(56) References Cited

U.S. PATENT DOCUMENTS

| | | | | |
|---|---|---|---|---|
| 2014/0217134 | A1* | 8/2014 | Rasa | B41J 2/04555 222/590 |
| 2017/0252828 | A1* | 9/2017 | Sachs | B33Y 50/02 |
| 2021/0323053 | A1* | 10/2021 | Gibson | B33Y 30/00 |
| 2022/0032550 | A1* | 2/2022 | Mantell | B22F 10/22 |
| 2022/0168812 | A1* | 6/2022 | Gibson | B33Y 10/00 |
| 2022/0355535 | A1* | 11/2022 | Bala | B29C 64/209 |
| 2023/0076563 | A1* | 3/2023 | Sheflin | B33Y 30/00 |

* cited by examiner

*Primary Examiner* — Christopher S Kessler

(74) *Attorney, Agent, or Firm* — MH2 Technology Law Group LLP

(57) ABSTRACT

A printer having a pump which includes an inner cavity which retains a liquid metal printing material, and a nozzle, where the nozzle is configured to eject a plurality of liquid metal drops, an actuation coil configured to supply a pulse to the liquid metal to generate an electromagnetic force upon the liquid metal, where the actuation coil supplies a pulse at a first time varying current pulse, where the electromagnetic force causes the nozzle to eject a drop of liquid metal. The actuation coil also supplies a pulse at a second time varying current pulse, where the electromagnetic force is not sufficient to eject a drop of liquid. A method for metal jetting in a printer is also disclosed where differences between the temperature in an upper portion of the pump and the temperature in a lower portion of the pump are minimized.

17 Claims, 10 Drawing Sheets

SYSTEM AND METHOD FOR CONTROLLING TEMPERATURE IN A THREE-DIMENSIONAL (3D) PRINTER

TECHNICAL FIELD

The present teachings relate generally to three-dimensional (3D) printing and, more particularly, to systems and methods for controlling the temperature within an ejector of the 3D printer.

BACKGROUND

A 3D printer builds (e.g., prints) a 3D part from a computer-aided design (CAD) model, usually by successively depositing material layer upon layer. For example, a first layer may be deposited upon a build plate, and then a second layer may be deposited upon the first layer. One particular type of 3D printer is a magnetohydrodynamic (MHD) printer, which is suitable for depositing liquid metal layer upon layer to form a 3D metallic object. Magnetohydrodynamic refers to the study of the magnetic properties and the behavior of electrically conducting fluids. In a MHD printer, an electrical current flows through a metal coil, which produces time-varying magnetic fields that induce eddy currents within a reservoir of liquid metal compositions. Coupling between magnetic and electric fields within the liquid metal results in Lorentz forces that cause drops of the liquid metal to be ejected (also referred to as jetted) through a nozzle of the printer. The drops land upon the build plate and/or the previously deposited drops to cause the 3D part to grow in size.

To enable the molten drops to bond to previously jetted drops and with previous build layers in the use of MHD printers, the drop temperature must be maintained at a sufficiently high temperature. Variations in drop temperatures, particularly at low drop temperatures, during the build process may lead to poor bonding which in turn can negatively impact the mechanical properties of the part, such as strength, ductility, and fatigue. In typical alloy print processes, the MHD pump is pulsed only when the drops are jetted, with each pulse generating a drop. The metal or metal alloy in the pump is maintained in a molten state using a resistive heating element, and a proportional integral (PI) controller is used to maintain the temperature, measured using a thermocouple located near the upper pump, at a desired setpoint. In standby mode the only heat source is the pump heater. However, during print mode, induction heating of the conductive molten material adds additional heat to the pump. Since the spatial profiles of the pump heater and the induction heating are different, the steady state temperatures in the pump near the nozzle exit can be significantly higher in a steady state print mode versus a steady state standby mode. During normal operation, however, the pump switches from standby to print mode or vice versa continually, the drop temperatures can exhibit transients that may last for tens of seconds depending on the part. In the current alloy print process, there is no way to mitigate these drop temperature transients that are likely to occur during part building. Therefore, a need exists to mitigate drop temperature transients and maintain consistent temperatures within a pump during and between both standby modes, printing modes, and during other operations executed within an MHD printer.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A printer is disclosed, the printer having a pump which includes an inner cavity associated therewith, the inner cavity retaining a liquid metal printing material, and a nozzle, where the nozzle is configured to eject a plurality of drops therethrough, and where the drops may include liquid metal, an actuation coil configured to supply a pulse to the liquid metal to generate an electromagnetic force upon the liquid metal, where the actuation coil supplies a pulse at a first time varying current pulse, and where the electromagnetic force causes the nozzle to eject a drop of liquid metal. The actuation coil also supplies a pulse at a second time varying current pulse, where the electromagnetic force is not sufficient to eject a drop of liquid metal through the nozzle.

Implementations of the present disclosure may include a printer where the first time varying current pulse may include a frequency of from about 50 Hz to about 800 Hz, a pulse width of from about 70 microseconds to about 150 microseconds, and a voltage of from about 150 V to about 200 V. The second time varying current pulse may include a frequency of from about 300 Hz to about 4000 Hz, a pulse width of from about 5 microseconds to about 150 microseconds, and a voltage of from about 50 V to about 400 V. The second time varying current pulse may include a frequency of about 800 Hz, and a pulse width of about 50 microseconds. When the actuation coil supplies a pulse at a second time varying current pulse, a temperature in an upper portion of the pump is from about 800° C. to about 850° C., a temperature in a lower portion of the pump is from about 800° C. to about 850° C., and a difference between the temperature in an upper portion of the pump and the temperature in a lower portion of the pump is less than 20° C.

A method for metal jetting in a 3D printer is also disclosed. The method for metal jetting in a 3D printer includes introducing a first time varying current pulse to a pump may include an inner cavity and a nozzle, where the inner cavity retains a liquid metal printing material, and the nozzle is configured to jet a plurality of drops therethrough, and the drops may include liquid metal. The method for metal jetting in a 3D printer also includes where the first time varying current pulse generates an electromagnetic force upon the liquid metal sufficient to jet a plurality of liquid metal drops through the nozzle. The method for metal jetting in a 3D printer also includes jetting a plurality of liquid metal drops. The method for metal jetting in a 3D printer also includes pausing the first time varying current pulse. The method for metal jetting in a 3D printer also includes introducing a second time varying current pulse to the pump, where the second time varying current pulse generates an electromagnetic force upon the liquid metal that is not sufficient to jet a plurality of liquid metal drops through the nozzle. The method for metal jetting in a 3D printer also includes pausing the second time varying current pulse. The method for metal jetting in a 3D printer also includes resuming the first time varying current pulse.

Implementations of the present disclosure include where the method for metal jetting in a 3D printer where the first time varying current pulse may include a frequency of from about 50 Hz to about 800 Hz, a pulse width of from about 70 microseconds to about 150 microseconds, and a voltage of from about 150 V to about 200 V. The second time varying current pulse may include a frequency of from about 300 Hz to about 4000 Hz, a pulse width of from about 5 microseconds to about 150 microseconds, and a voltage of from about 50 V to about 400 V. The second time varying current pulse may include a frequency of about 800 Hz and a pulse width of about 50 microseconds. When the second time varying current pulse is introduced into the pump, a temperature in an upper portion of the pump is from about 800° C. to about 850° C., a temperature in a lower portion of the pump is from about 800° C. to about 850° C., and a difference between the temperature in an upper portion of the pump and the temperature in a lower portion of the pump is less than 20° C. The method for metal jetting in a 3D printer may include initiating a standby mode in the 3D printer prior to introducing the second time varying current pulse to the pump. The method for metal jetting in a 3D printer may include initiating a preheat mode in the 3D printer prior to introducing the second time varying current pulse to the pump. The method for metal jetting in a 3D printer may include performing a level verification operation in the 3D printer prior to introducing the second time varying current pulse to the pump. The method for metal jetting in a 3D printer may include performing a z-scan operation in the 3D printer prior to introducing the second time varying current pulse to the pump. The method for metal jetting in a 3D printer may include changing a direction of the nozzle during an operation of printing a 3D part in the 3D printer, spanning a distance between a first structural feature of a 3D part and a second structural feature of a 3D part in a 3D printer, or a combination thereof, prior to introducing the second time varying current pulse to the pump. The first time varying current pulse may include a frequency of from about 50 Hz to about 800 Hz; a pulse width of from about 70 microseconds to about 150 microseconds; and a voltage of from about 150 V to about 200 V.

Another method for metal jetting is disclosed. The method for metal jetting includes introducing a first time varying current pulse to a pump which includes an inner cavity and a nozzle, where the inner cavity retains a liquid metal printing material, the nozzle is configured to jet a plurality of drops therethrough, and where the drops may include liquid metal. The method for metal jetting also includes where the first time varying current pulse generates an electromagnetic force upon the liquid metal sufficient to jet a plurality of liquid metal drops through the nozzle. The method for metal jetting also includes jetting a plurality of liquid metal drops. The method for metal jetting also includes introducing a second time varying current pulse to the pump, where the second time varying current pulse generates an electromagnetic force upon the liquid metal that is not sufficient to jet a plurality of liquid metal drops through the nozzle. Implementations of the method for metal jetting may include where the first time varying current pulse and the second time varying current pulse are introduced to the pump simultaneously. The second time varying current pulse may include a frequency of from about 300 Hz to about 4000 Hz; a pulse width of from about 5 microseconds to about 150 microseconds; and a voltage of from about 50 V to about 400 V. The second time varying current pulse may include a frequency of about 800 Hz and a pulse width of about 50 microseconds. When the second time varying current pulse is introduced into the pump a temperature in an upper portion of the pump is from about 800° C. to about 850° C., a temperature in a lower portion of the pump is from about 800° C. to about 850° C., and a difference between the temperature in an upper portion of the pump and the temperature in a lower portion of the pump is less than 20° C.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures:

FIG. 5A depicts a standby mode with coils off. FIG. 5B depicts a proposed standby mode using sub-threshold pulsing.

Figure 1:
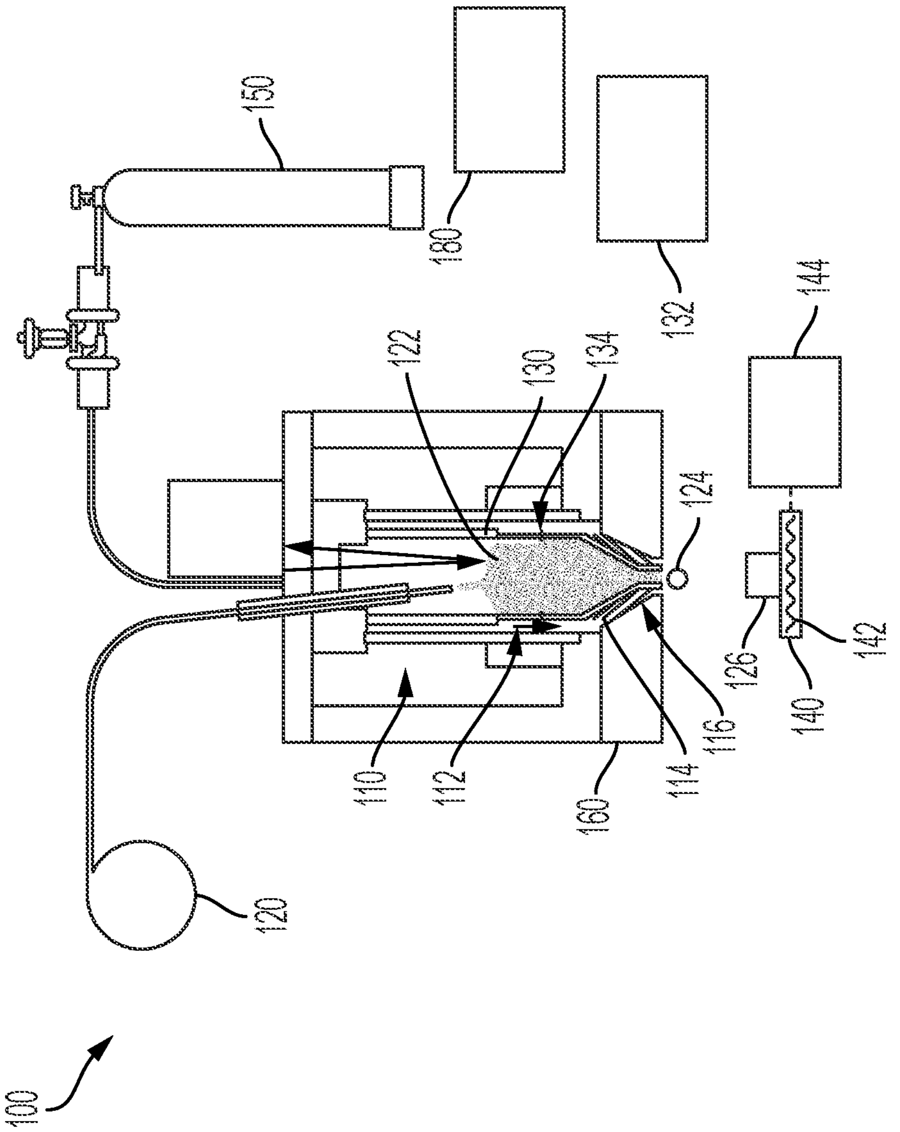
FIG. 1 depicts a schematic cross-sectional view of a 3D printer, in accordance with the present disclosure.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

The systems and methods disclosed herein are directed to a three-dimensional (3D) printer. The 3D printer may be or include a drop-on-demand printer that is configured to print (i.e., build) a 3D part. As described in greater detail below, the 3D printer may use a magnetohydrodynamic (MHD) process to jet small drops of liquid material (e.g., metal) in response to introducing time varying current pulses under a variety of conditions, both at standard jetting setpoints and at sub-threshold parameters, as will be described later herein. Using this technology, the 3D part can be created from the material by ejecting a series of drops which exhibit improved bonding together, between adjacent drops and in adjacent layers. The mitigation of drop temperature transients and maintenance of consistent temperatures within a pump during and between both standby modes, printing modes, and during other operations executed within an MHD printer provides such improvements.

The system and methods described herein introduce or supply sub-threshold pulsing of the MHD actuation coil, which avoids ejection of a droplet, but provides sufficient inductive heating, which is supplemental to standard heating employed in such printing systems. This type of sub-threshold time varying current pulse may be used during warm-up, standby modes, and in other transitional periods. During print mode, the MHD pump may revert to the normal coil pulse and eject droplets as dictated by the print job. The sub-threshold pulsing may generate low to negligible Lorentz forces on the molten metal in the pump, far below those needed to eject a drop, or even induce noticeable displacement of the meniscus free surface. The sub-threshold pulses will, however, be sufficient to generate induction heating in the low to mid-pump regions, thereby countering heat losses due to convection and radiation. This may ensure that the molten metal in the lower pump and nozzle region is close to its desired value in standby mode, and mitigate any undesirable transients in drop temperatures that can impact part quality.

Sub-threshold pulsing, or sub-threshold time varying current pulsing as described herein, refers to a delivery of pulses to an MHD printhead ejector under certain parameters that deliver a pulse below a threshold required to initiate a jetting event within an ejector for a metal jetting or MHD printing system. In the use of printheads that use an MHD pump to jet molten metal or metal alloy droplets, coils surrounding the pump are pulsed with a time varying current pulse to generate a Lorentz force in the conductive molten metal in the pump which in turn ejects metal droplets through a nozzle aperture. The droplets are usually generated only when the coil is pulsed. The metal or metal alloy in the pump is maintained in a molten state using a resistive heating element, and a PI controller which is used to maintain the temperature, measured using a thermocouple located near the upper pump, at a desired setpoint.

FIG. 1 depicts a schematic cross-sectional view of a 3D printer 100, in accordance with the present disclosure. The 3D printer 100 may include a pump (also referred to as a pump chamber or ejector) 110. The pump 110 may include a first (e.g., upper) portion 112 and a second (e.g., lower) portion 114. The lower portion 114 may be or include a nozzle 116.

The pump 110 may define an inner volume that is configured to receive a printing material 120. The inner volume, or inner cavity, retains the liquid metal printing material 120. The printing material 120 may be or include a metal, a polymer (e.g., a photopolymer), or the like. For example, the printing material 120 may be or include aluminum (e.g., a spool of aluminum wire). The aluminum may be AA 4008, AA 6061, AA 7075, or the like. In another example, the printing material 120 may be or include copper.

The 3D printer 100 may also include one or more heating elements 130. The heating elements 130 are configured to melt the printing material 120 within the inner volume of the pump 110, thereby converting the printing material 120 from a solid material to a liquid material (e.g., liquid metal) 122 within the inner volume of the pump 110. Depending on the speed or frequency of successive drop ejections, among other considerations related to heat loss, the upper portion 112 and the lower portion 114 of the pump 110 may exhibit differences during various operation sequences.

The 3D printer 100 may also include a power source 132 and one or more metallic coils 134. The metallic coils 134 are wrapped at least partially around the pump 110 and/or the heating elements 130. The power source 132 may be coupled to the coils 134 and configured to provide power thereto. In one example, the power source 132 may be configured to provide one or more step function direct current (DC) voltage profiles (e.g., voltage pulses) to the coils 134, which may create an increasing magnetic field, which may also be referred to as time varying current pulses. The increasing magnetic field may cause an electromotive force within the pump 110, that in turn causes an induced electrical current in the liquid metal 122. The magnetic field and the induced electrical current in the liquid metal 122 may create a radially inward force on the liquid metal 122, known as a Lorenz force. The Lorenz force, at sufficient magnitude, creates a pressure at an inlet of the nozzle 116 of the pump 110. The pressure causes the liquid metal 122 to be jetted through the nozzle 116 in the form of one or more drops 124. In some instances, the magnitude of the Lorentz forces may be low enough such that it is insufficient to generate or create enough pressure to cause liquid metal 122 to be jetted through the nozzle 116. When the pulses, forces, or pressures are at this lower level, they may be referred to as sub-threshold, as they are below a threshold required to cause jetting through the nozzle 116 of a pump 110.

As the drops 124 are jetted, and new printing material 120 is fed into the pump 110, dross may accumulate in the pump 110 (e.g., in the upper portion 112). As used herein, "dross" refers to oxides and/or other contaminants. The build-up of dross may be a function of the total throughput of printing material 120 through the pump 110. As the dross builds within the pump 110, it may clog the pump 110. The dross may be removed (e.g., using a vacuum).

The 3D printer 100 may also include a build plate (also referred to as a build surface or substrate) 140 that is positioned below the nozzle 116. The drops 124 that are jetted through the nozzle 116 may land upon the build plate 140 and cool and solidify to produce a 3D part 126. The build plate 140 may include a heater 142 therein that is configured to increase the temperature of the build plate 140 and the 3D part 126 thereon. As mentioned above, as the height of the 3D part 126 increases, the upper surface of the 3D part 126 becomes farther from the heated build plate 140, which may cause the upper surface of the 3D part 126 to cool faster as the 3D part 126 grows taller. Some of this temperature differential may also be related to temperature differences between the upper portion 112 and the lower portion 114 of the pump 110.

The 3D printer 100 may also include a build plate control motor 144 that is configured to move the build plate 140 as the drops 124 are being jetted (i.e., during the printing process) to cause the 3D part 126 to have the desired shape and size. The build plate control motor 144 may be configured to move the build plate 140 in one dimension (e.g., along an X axis), in two dimensions (e.g., along the X axis and a Y axis), or in three dimensions (e.g., along the X axis, the Y axis, and a Z axis). As used herein, the X and Y axes are in a horizontal plane, and the Z axis is vertical. In another example, the pump 110 and/or the nozzle 116 may also or instead be configured to move in one, two, or three dimensions.

The 3D printer 100 may also include one or more shield gas sources (one is shown: 150). The shield gas source 150 may be configured to introduce a shield gas that at least partially surrounds the nozzle 116, the drops 124, the 3D part 126, or a combination thereof. The shield gas may be or include an inert gas such as argon. The shield gas may reduce oxidization as the drops 124 are falling to the build plate 140.

The 3D printer 100 may also include a heat control device 160. The heat control device 160 may be configured to at least partially isolate the environment proximate to the 3D part 126 from the environment distal from the 3D part 126. More particularly, the heat control device 160 may help to reduce the amount of heat (e.g., from the printing process) that escapes from the environment inside of a build volume to the environment outside of the build volume. This, in turn, may reduce the amount by which the temperature of the (e.g., top) surface of the 3D part 126 decreases as the height of the 3D part 126 increases.

The 3D printer 100 may also include a computing system 180. The computing system 180 may be configured to control the printing process. More particularly, the computing system 180 may be configured to control the pump 110, the introduction of the printing material 120, the heating elements 130, the power source 132, the build plate 140, the heater 142, the control motor 144, the shield gas sources 150, the heat control device 160, or a combination thereof.

Figure 2:
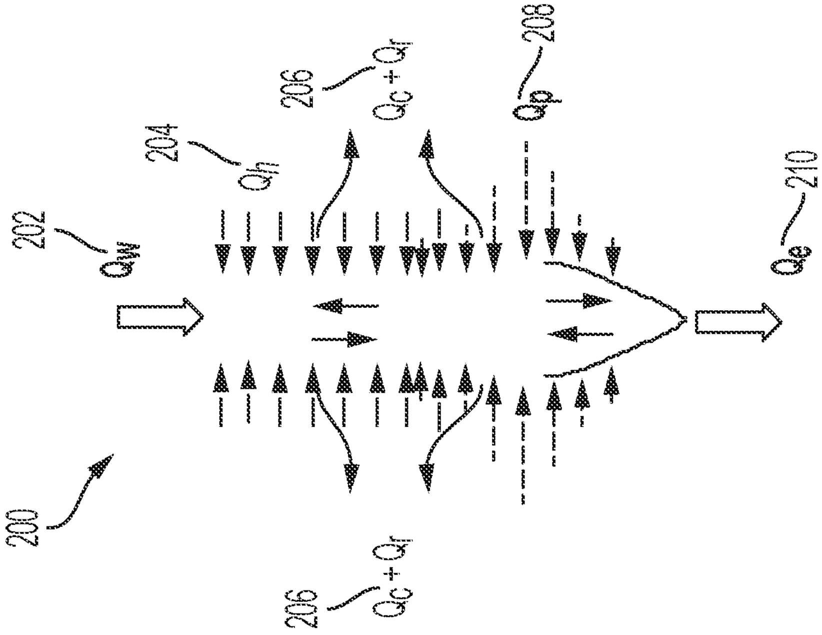
FIG. 2 depicts a schematic and heat balance equation representing a simplified view of a pump from the 3D printer of FIG. 1 and the respective thermal loads in the pump, in accordance with the present disclosure.

FIG. 2 depicts a schematic and heat balance equation representing a simplified view of a pump from the 3D printer of FIG. 1 and the respective thermal loads in the pump, in accordance with the present disclosure. A cross-sectional schematic view of a pump 200 for a 3D metal jetting printer is shown with several indications of several thermal loads and their respective directionalities in and out of the pump 200. These thermal loads include energy lost to melting the wire, Qw 202, which may be frequency dependent, energy added by the proportional integral derivative (PID) controlled heater Qh 204, radiation heat losses (Qr) and convection heat losses (Qc) Qc+Qr 206, energy added by induction heating, Qp 208, which may be frequency dependent, and energy lost due to drop ejection, Qe 210, which also may be frequency dependent. Each of the above-referenced heat losses includes a directional area indicating an approximate position on the pump 200 where the heat is either added or lost, with an arrow towards the pump 200 being indicative of heat being added to the pump and an arrow away from the pump 200 representing being lost by the pump 200. An approximation for the heat balance as represented in FIG. 2 may be expressed as follows, in Eq. 1:

$$\frac{d\int_V \rho c T dv}{dt} = Q_h + Q_p - Q_w - Q_e - Q_c - Q_r \quad \text{(Eq. 1)}$$

In previous 3D MHD metal jetting printers, the induction heating component, Qp 208, may not have been considered as a means of effectively adding heat to a pump 200 or regulating temperature consistency of a molten printing material within the pump 200. The above equation, Eq. 1, has been used to approximate conditions and parameters in the following simulations and methods derived therefrom.

Figure 3A:
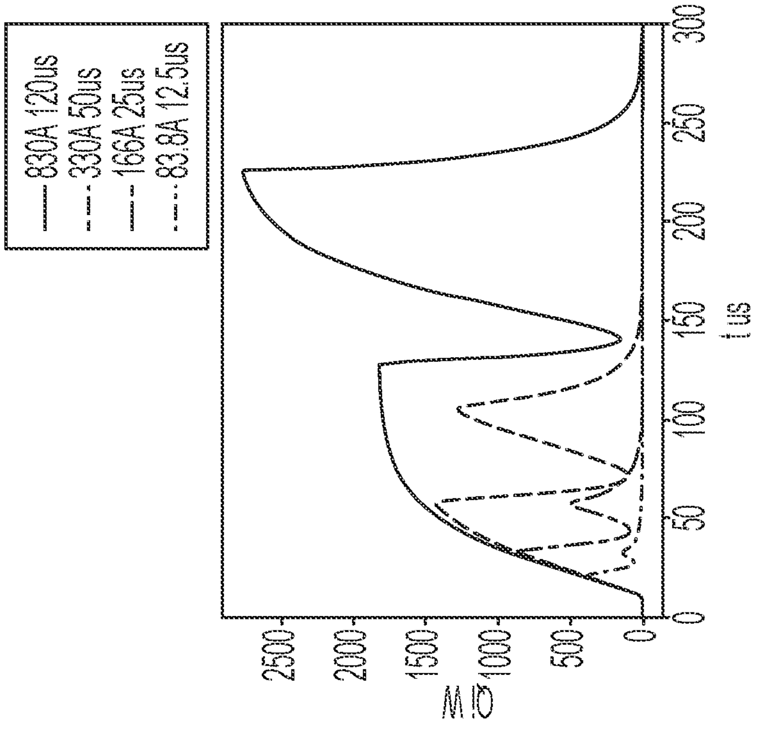
FIGS. 3A and 3B depict graphs showing induction heating in a pump in a 3D printer, from normal jetting pulses compared to sub-threshold pulses, and induction heat added to the pump (integrated over the pump volume) during a single coil pulse, respectively, in accordance with the present disclosure.
Figure 3B:
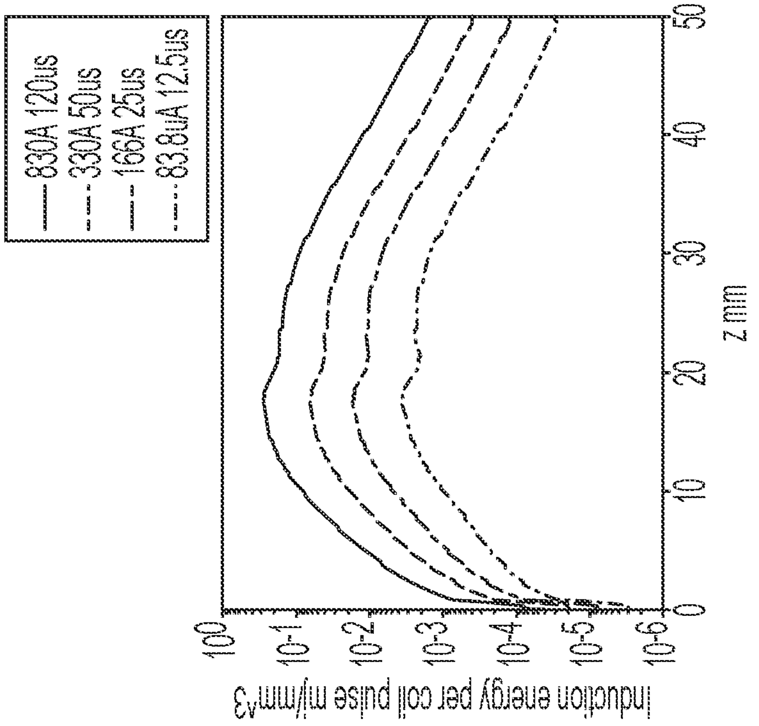

FIGS. 3A and 3B depict graphs showing induction heating in a pump in a 3D printer, from normal jetting pulses compared to sub-threshold pulses, and induction heat added to the pump (integrated over the pump volume) during a single coil pulse, respectively, in accordance with the present disclosure. During normal printing operations, the pump switches continually between standby and print modes, where the coils are pulsed only in the print mode at a single time varying current pulse. From a printhead thermal viewpoint, the print mode differs from the standby mode in two respects. First, cold wire printing material feeding into the upper pump is heated and melted, and second, induction heating of the molten metal by the magnetic field generated by the coil pulse. While pulsing the coils using sub-threshold pulses introduces induction heating to the pump and therefore the metal printing material, it is not sufficient to jet metal from the pump. FIG. 3A shows the induction heating power input (Qi W) into the pump due to one normal pulse (at 830 A and 12 μs) and various sub-threshold pulses (at 330 A and 50 μs, 166 A and 25 μs, and at 83.8 A and 12.5 μs, respectively). FIG. 3B depicts the induction energy per coil pulse in mJ per cubic millimeter as a function of the distance from the nozzle, z, in millimeters. A sub-threshold pulse, or sub-threshold time varying current pulse, by definition is one that is below the threshold needed to generate a drop. The current pulse generated in a sub-threshold range is also below a threshold needed to perturb the meniscus significantly, so as to not create any transients in jetting behavior when switching from standby to print modes. In certain examples, however, it may be desirable for the sub-threshold pulse to perturb the meniscus slightly so as to eliminate any latency effects at the start of printing after a delay. The sub-threshold pulse is typically at a lower current and lower pulse width. The lower pulse width may further allow sub-threshold pulses to be used at higher jetting frequencies. It should be noted that while jetting frequency is used to denote the frequency at which these pulses are repeated it is not representative of any jetting event within this context. Higher jetting frequencies for sub-threshold pulses allows the for significant induction heat to be added in standby modes, which scales linearly with jetting frequency, while avoiding high Lorentz forces in the pump which generate meniscus motion. Table 1, below, shows the options with the various sub-threshold pulses shown in FIGS. 3A and 3B. In general, higher frequencies are needed with lower current pulses to compensate for the lower induction heating per pulse.

TABLE 1

Sub-threshold pulsing conditions

| | I (A) | pw 1 (μs) | pw 2 (ms) | Qi (J) per coil pulse | Frequency (Hz) | Induction Heat Power (W) | Maximum Frequency (Hz) |
|---|---|---|---|---|---|---|---|
| Normal | 830 | 120 | 96 | 0.361 | 300 | 108.3 | 4630 |
| Sub-threshold | 330 | 50 | 47 | 00846 | 800 | 67.68 | 10309 |
| Sub-threshold | 166 | 25 | 23 | 0.0222 | 3049 | 67.68 | 20833 |
| Sub-threshold | 83.8 | 12.5 | 10.8 | 0.0047 | 14400 | 67.68 | 42918 |

In certain examples of operating a 3D printer, one or more time varying current pulses may be referred to as a sub-threshold pulse, when they are below a threshold required to initiate a jetting event within an ejector for a metal jetting or MHD printing system. Such a 3D printer may include a pump comprising a nozzle, wherein the nozzle is configured to eject a plurality of drops therethrough, and wherein the drops comprise liquid metal. An actuation coil supplies a pulse to the liquid metal to generate an electromagnetic force upon the liquid metal, including an actuation coil configured to pulse at a first time varying current pulse, wherein the electromagnetic force causes the nozzle to eject a drop of liquid metal, and further causes the actuation coil to pulse at a second time varying current pulse, wherein the electromagnetic force is not sufficient to eject a drop of liquid metal through the nozzle. Ranges of the first time varying current pulse, which results in a drop being jetted from the nozzle may be at a frequency of from about 50 Hz to about 800 Hz, a pulse width of from about 70 microseconds to about 150 microseconds, and a voltage of from about 150 V to about 200 V. The second time varying current pulse, which provides additional induction heating to the pump, without initiating a jetting event, and may further be referred to as a sub-threshold pulse, may be at a frequency of from about 800 Hz to about 4000 Hz, a pulse width of from about 5 microseconds to about 50 microseconds, and a voltage of from about 50 V to about 200 V. In an exemplary example, the second, sub-threshold time varying current pulse may be at a frequency of about 800 Hz, and a pulse width of about 50 microseconds. When the actuation coil pulses at a second time varying current pulse, or sub-threshold pulse, according to the present disclosure, a temperature in an upper portion of the pump is maintained at a temperature from about 800° C. to about 850° C., a temperature in a lower portion of the pump is maintained at a temperature from about 800° C. to about 850° C., and the difference between the temperature in an upper portion of the pump and the temperature in a lower portion of the pump is less than 20° C. While the frequency, pulse width, voltage, and temperature ranges described herein can be applicable to liquid metal printing materials, including, but not limited to, aluminum or aluminum alloys, other liquid metal printing materials may utilize operating parameters overlapping or outside the specific ranges disclosed herein. In certain examples, temperatures in either the upper or lower portions of the pump can be maintained at a temperature from about 800° C. to about 1500° C., which can be suitable for nominal melting temperature ranges for alloys based on copper (~1200° C.), stainless steel, or alloys based on iron (~1450° C.), as well as aluminum and other metals and metal alloys suitable for liquid metal printing.

Figure 4:
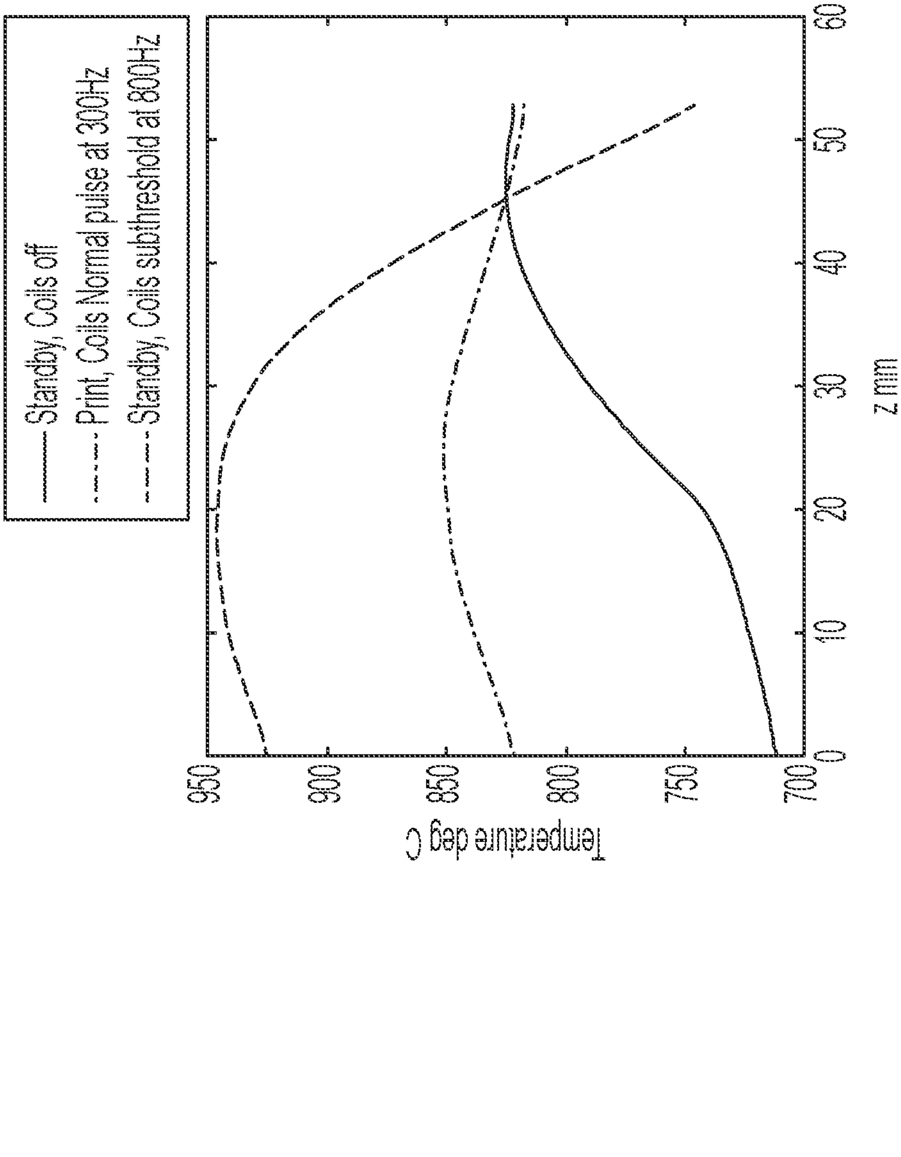
FIG. 4 depicts a graph representing simulated pump temperatures in print and standby modes with coils off and coils on using subthreshold pulsing, in accordance with the present disclosure.

FIG. 4 depicts a graph representing simulated pump temperatures in print and standby modes with coils off and coils on using subthreshold pulsing, in accordance with the present disclosure. Simulated overall pump temperatures are compared for three operation modes. The first mode is in standby modes, with coils off. The second mode is in print mode, with normal pulses at 300 Hz. The third mode is in standby, with coils pulsing at sub-threshold time varying current pulses at 800 Hz. In each mode, the PID controller is maintaining the temperature at the thermocouple location to 825° C., with steady state pump temperatures for print mode using 830 A, 120 uA coil pulse at 300 Hz jetting frequency and standby modes with coils off and coils actuated with sub-threshold pulses at 330 A, 50 uA, 800 Hz. In all cases, the PID controller is controlling the temperature in the upper pump at 825° C., the point at which the curves intersect. In the coil off standby mode, a temperature reduction of about 100° C. is observed from the thermocouple location at the upper pump to the nozzle exit, z=0. The steady state pump temperatures near the lower pump and nozzle, during print mode in particular, is much hotter in the print mode due to induction heating. The temperature at the nozzle exit, i.e. z=0, is indicative of the drop temperature. As the pump enters print mode after a prolonged duration in the standby mode, it is expected that the drop temperatures may be substantially colder than observed when firing drops continuously, such as in a large infill area. For an alloy print process, layer to layer bonding in the printed part is critical to achieving good mechanical properties, and high drop temperatures are required to achieve sufficient remelt of previous layers to ensure good bonding. For standby mode using sub-threshold pulses, the pump temperatures are significantly higher than with coils off, and this enables higher drop temperatures during jetting, especially during transitions from standby to print.

Figure 5A:
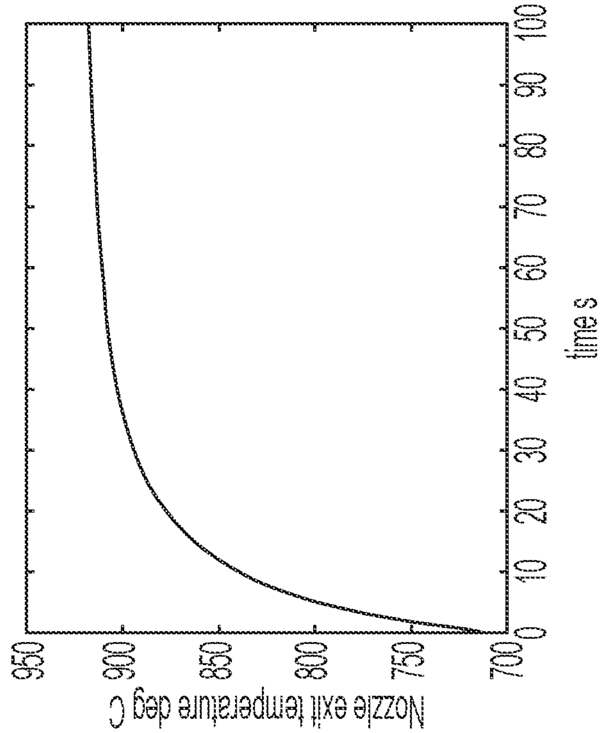
FIGS. 5A and 5B depict graphs representing simulated drop temperature transients while switching from standby to print modes, in accordance with the present disclosure.
Figure 5B:
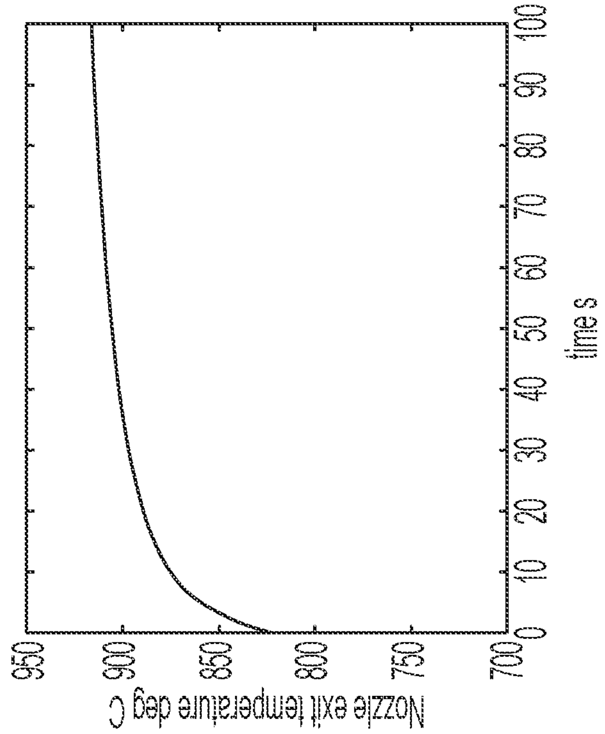

FIGS. 5A and 5B depict graphs representing simulated drop temperature transients while switching from standby to print modes, in accordance with the present disclosure. FIG. 5A depicts a standby mode with coils off. FIG. 5B depicts a proposed standby mode using sub-threshold pulsing. FIG. 5A depicts a control case of standby mode with coils off, with no additional sub-threshold time varying current pulses. FIG. 5B shows a standby mode with additional subthreshold time varying current pulsing. It can be observed that drop temperature transients can be substantially mitigated with sub-threshold pulsing, as indicated by the higher temperature at the 0 second time frame in FIG. 5B.

Figure 6A:
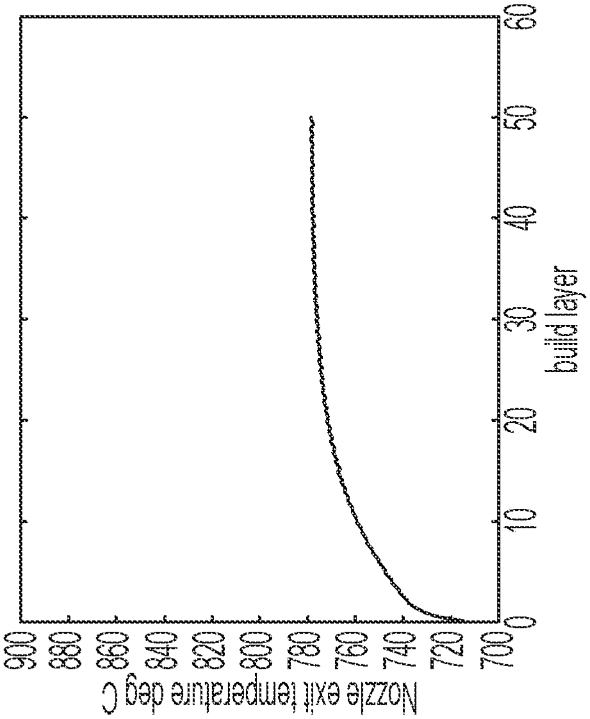
FIGS. 6A and 6B depict graphs representing simulated drop temperature transients during printing of a 10 mm×10 mm cross-section pillar, showing a standby mode with coils off and a standby mode with coils on and using sub-threshold pulsing, respectively, in accordance with the present disclosure.
Figure 6B:
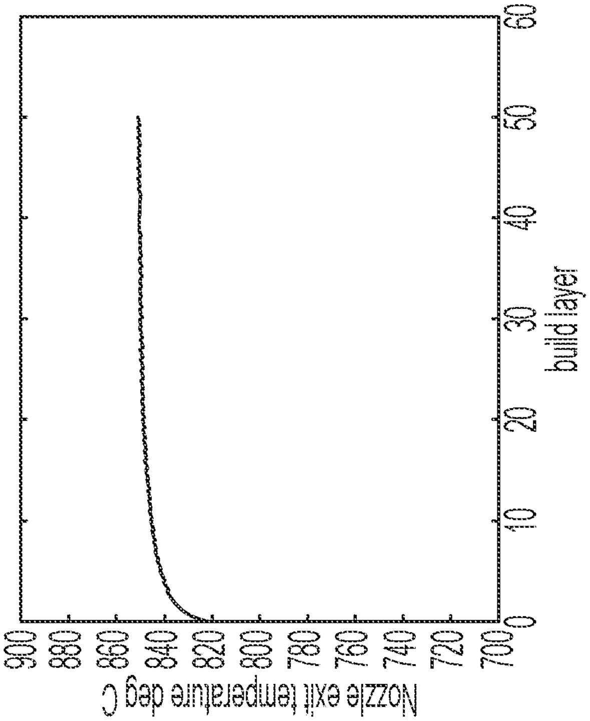

FIGS. 6A and 6B depict graphs representing simulated drop temperature transients during printing of a 10 mm×10 mm cross-section pillar, showing a standby mode with coils off and a standby mode with coils on and using sub-threshold pulsing, respectively, in accordance with the present disclosure. Within a case of 3D printing or building a 10 mm×10 mm cross-section pillar, also referred to as a "french fry" in z. Conditions of the print include a time in print mode per layer at 300 Hz, using a drop spacing of 0.5 mm with a line spacing of 0.5 mm, resulting in an approximate print time of roughly 1.33 s, as calculated by (10/0.5)*(10/0.5)/300≈1.33 s. An estimated time for a layer under such conditions is approximately 5.77 s, which includes time to accelerate to speed before printing first drop in a scan line, time between lines, time to return to start between layers, etc. Additional printing conditions include a time in standby mode per layer of approximately 4.44 s, or 77% of total time per layer. This also does not include z scanning, which is currently done at an interval of every 5 layers. FIGS. 6A and 6B depict simulated drop temperature during printing of the aforementioned 10 mm×10 mm c/s part. It can be observed that when the coils are off during standby mode, in FIG. 6A, the drops appear to reach a maximum temperature of 780° C. during the build process with a 70° C. change occurring during the first 10-20 layers. However, when using sub-threshold pulse during standby mode, FIG. 6B, the drops reach a maximum temperature of 850° C. with only a 25° C. change during the first few (≈5) layers.

Figure 7A:
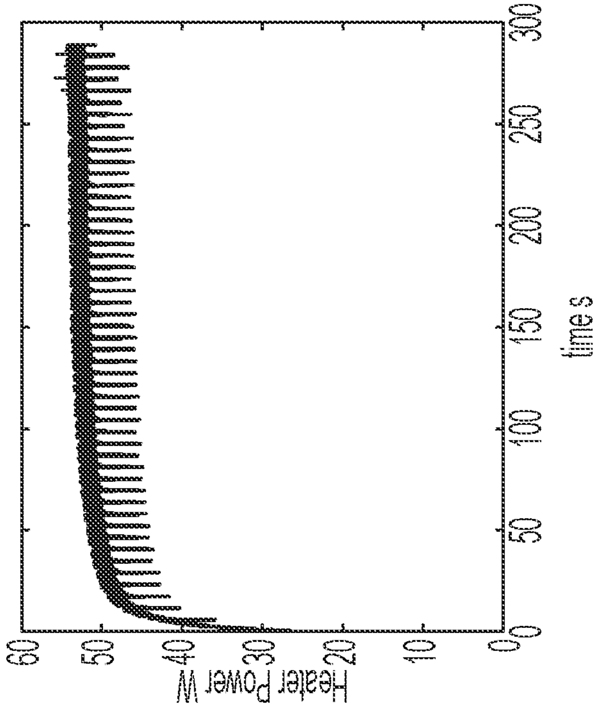
FIGS. 7A and 7B depict graphs representing simulated heater power during printing of a 10 mm×10 mm cross-section pillar showing a standby mode with coils off and a standby mode with coils with sub-threshold pulsing, respectively, in accordance with the present disclosure.
Figure 7B:
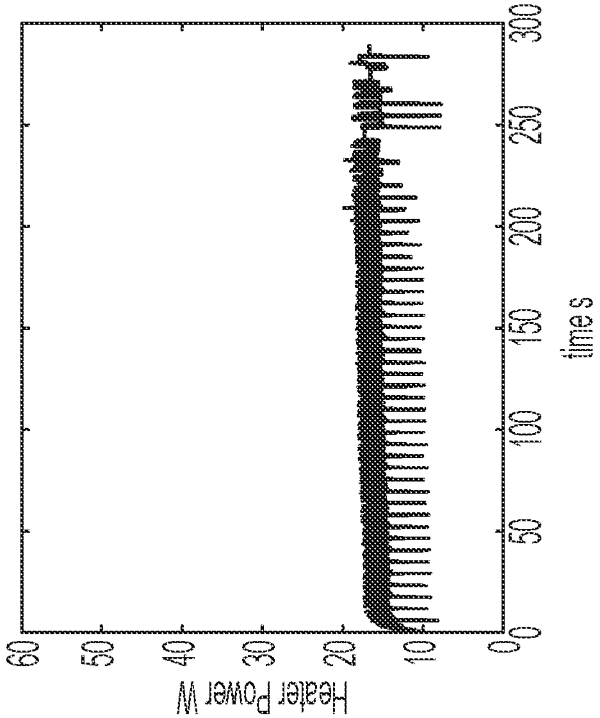

FIGS. 7A and 7B depict graphs representing simulated heater power during printing of a 10 mm×10 mm cross-section pillar showing a standby mode with coils off and a standby mode with coils with sub-threshold pulsing, respectively, in accordance with the present disclosure. Simulated heater power during printing of a 10 mm×10 mm cross-section pillar, similar to that described previously. In FIG.

7A, a standby mode with coils off, control, is shown. FIG. 7B represents a similar standby mode with coils delivering sub-threshold pulsing. The temperature setpoint is 825° C. and FIGS. 7A and 7B show the corresponding heater power in Watts required by the pump heater for the standby mode, with and without sub-threshold pulsing, respectively. It can be observed that a lower power to the heaters is required in the sub-threshold pulsing mode, FIG. 7B, due to the induction heating delivered to the pump.

Figure 8B:
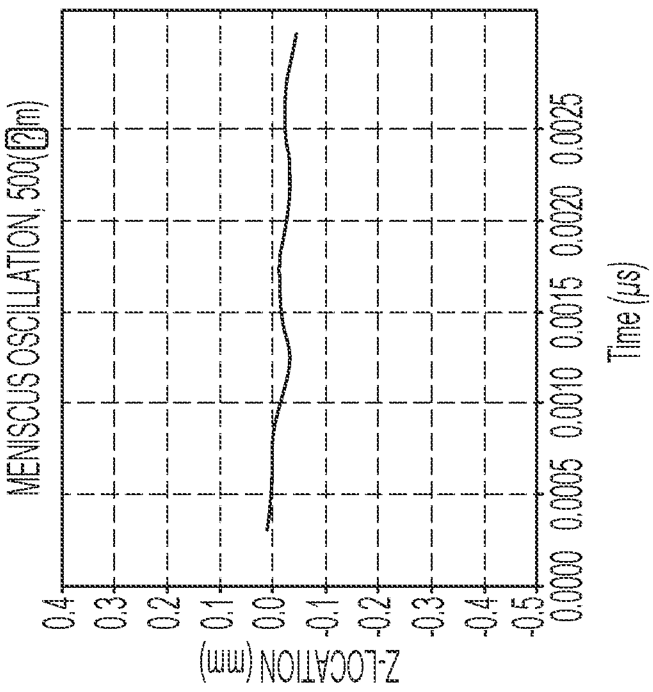
FIGS. 8A and 8B depict graphs representing simulated nozzle dynamics and pressure distribution above the orifice using sub-threshold pulses and meniscus behavior, respectively, in accordance with the present disclosure.
Figure 8A:
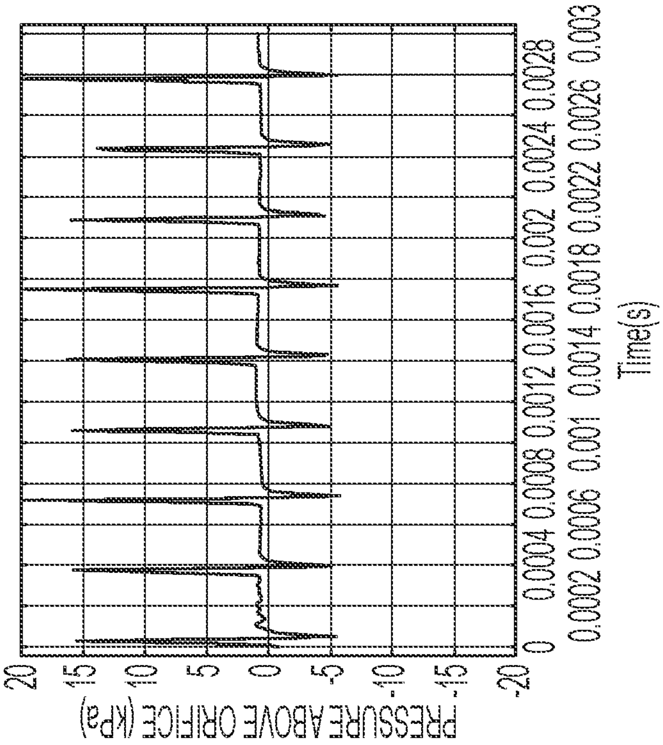

FIGS. 8A and 8B depict graphs representing simulated nozzle dynamics and pressure distribution above the orifice using sub-threshold pulses and meniscus behavior, respectively, in accordance with the present disclosure. Nozzle dynamics are shown using a 166 A, 25 μs, and 3000 Hz sub-threshold pulse. Pressure distribution above the orifice is shown in FIG. 8A, while meniscus behavior is shown in FIG. 8B. It can be observed in FIG. 8B that the meniscus is relatively quiescent and unlikely to result in any adverse behavior when switched to a print mode from a standby mode using sub-threshold time varying pulses. Another example of this concept includes the use of such subthreshold pulsing in-between jetting pulses to raise the drop temperature while jetting. In this example, a drop is fired in jetting mode, then sub-threshold pulses in standby mode are fired, then one or more drops are fired in jet mode, and so on. As an example, the jetting pulse would be at 600-800 Hz, but only firing every other drop, every other drop, or every third drop, with a normal pulse waveform, with the others, for example, intermittent pulses being at a sub-threshold level, such that the actual build would be at 300-400 Hz, but with the added heat of 600-800 Hz.

Figure 9:
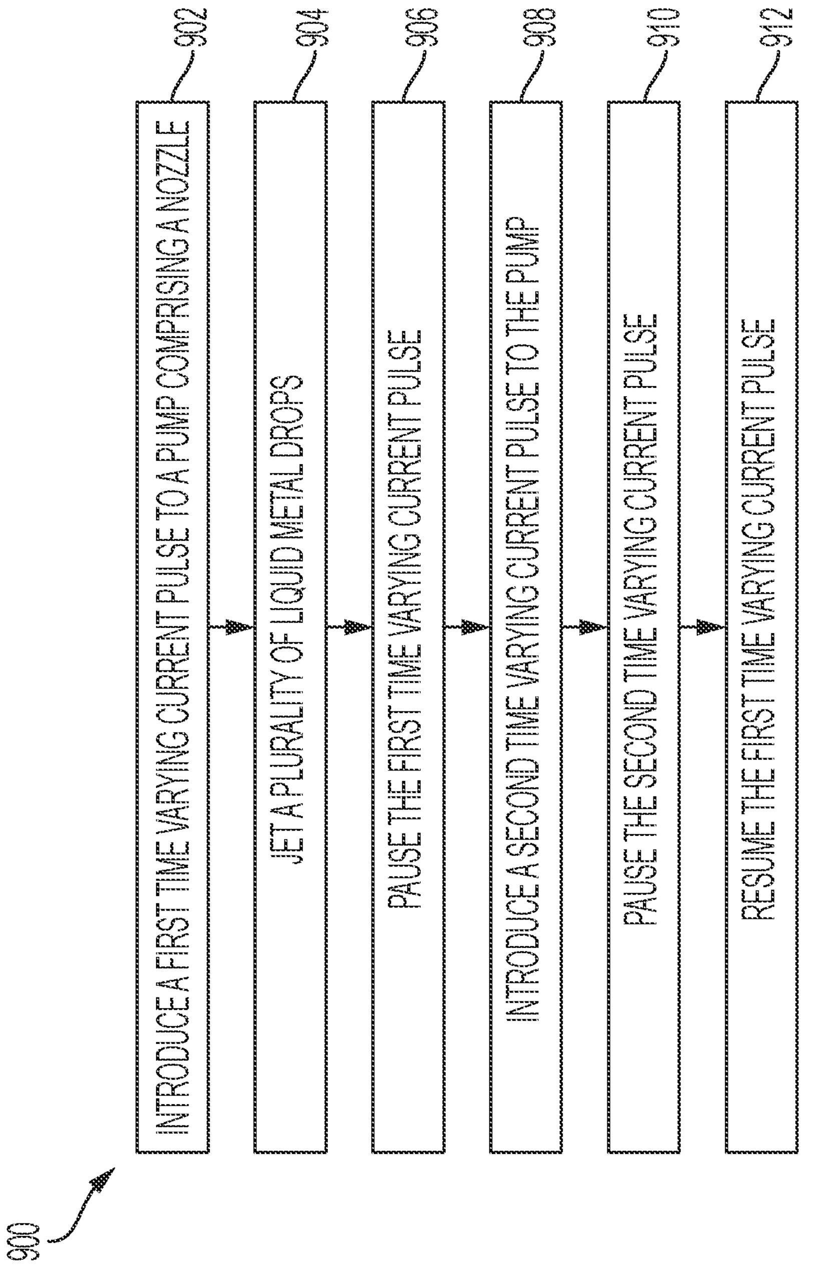
FIG. 9 depicts a flowchart of a method for printing a 3D part with improved temperature control, in accordance with the present disclosure.

FIG. 9 depicts a flowchart of a method for printing a 3D part with improved temperature control, in accordance with the present disclosure. A method for metal jetting in a 3D printer 900 introduces a first time varying current pulse to a pump comprising a nozzle 902, where the nozzle is configured to jet a plurality of drops therethrough, and wherein the drops comprise liquid metal, and the first time varying current pulse generates an electromagnetic force upon the liquid metal sufficient to jet a plurality of liquid metal drops through the nozzle, thus jetting a plurality of liquid metal drops 904. Next, the first time varying current pulse is paused 906 and second time varying current pulse is introduced to the pump 908. This second time varying current pulse generates an electromagnetic force upon the liquid metal that is not sufficient to jet a plurality of liquid metal drops through the nozzle. Then, the second time varying current pulse is paused 910 and the first time varying current pulse 912 is resumed. The method for metal jetting in a 3D printer 900 includes a first time varying current pulse conducted at a frequency of from about 300 Hz to about 400 Hz, a pulse width of from about 70 microseconds to about 150 microseconds, and a voltage of from about 160 V to about 200 V. The second time varying current pulse may be conducted at a frequency of from about 300 Hz to about 4000 Hz, a pulse width of from about 5 microseconds to about 150 microseconds, and a voltage of from about 50 V to about 400 V. In other examples of a method for metal jetting in a 3D printer 900, the second time varying current pulse may be conducted at a frequency of about 800 Hz and a pulse width of about 50 microseconds. In alternate examples of the method for metal jetting in a 3D printer 900 the second time varying current pulse is introduced into the pump, providing for a temperature in an upper portion of the pump from about 800° C. to about 850° C., a temperature in a lower portion of the pump from about 800° C. to about 850° C., and a difference between the temperature in an upper portion of the pump and the temperature in a lower portion of the pump is less than 20° C. In some aspects of the method for metal jetting in a 3D printer 900 a standby mode is initiated prior to introducing the second time varying current pulse to the pump. In other aspects, a preheat mode or a level verification operation in the 3D printer is initiated prior to introducing the second time varying current pulse to the pump. Other examples include changing a direction of the nozzle during an operation of printing a 3D part in the 3D printer, spanning a distance between a first structural feature of a 3D part and a second structural feature of a 3D part in a 3D printer, or a combination thereof, prior to introducing the second time varying current pulse to the pump. Still other examples include pauses in printing such as an operation that occurs during a z-scan operation, where printing is paused while the 3D part surface is scanned and analyzed. Depending on the size and complexity of the 3D part surface, this operation can produce a significant delay, leading to a substantial drop in ejected drop temperature. Sub-threshold jetting as described herein can alleviate drop temperature transients prior to, during, or following z-scan operations.

Figure 10:
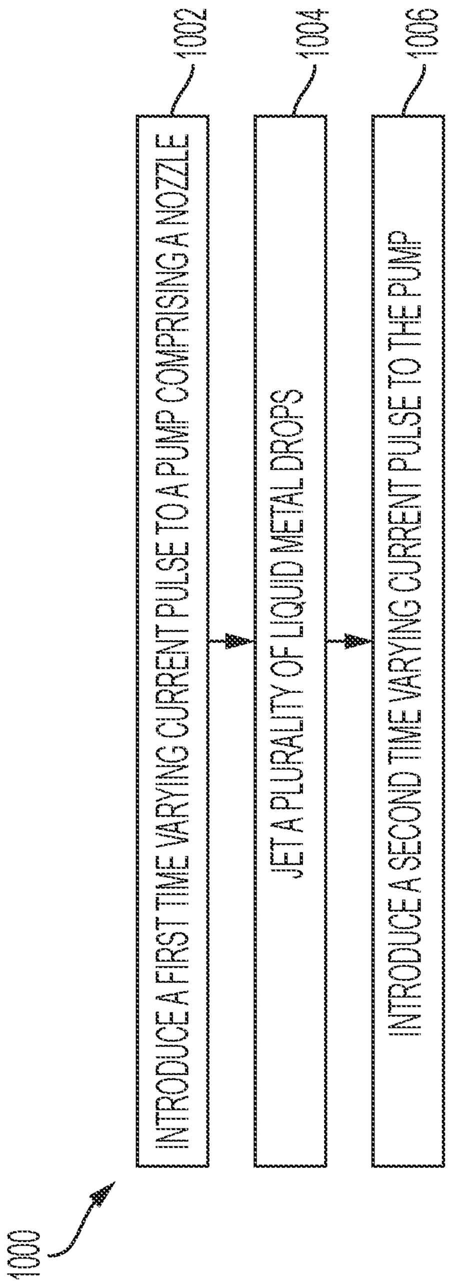
FIG. 10 depicts a flowchart of a method for printing a 3D part with improved temperature control, in accordance with the present disclosure.

FIG. 10 depicts a flowchart of a method for printing a 3D part with improved temperature control, in accordance with the present disclosure. A method for metal jetting 1000, begins with the introduction of a first time varying current pulse to a pump comprising a nozzle 1002. This first time varying current pulse includes where the nozzle is configured to jet a plurality of drops therethrough, and wherein the drops comprise liquid metal, and the first time varying current pulse generates an electromagnetic force upon the liquid metal sufficient to jet a plurality of liquid metal drops through the nozzle, thus jetting a plurality of liquid metal drops 1004. Next the method for metal jetting 1000 continues with the introduction of a second time varying current pulse to the pump 1006, where the second time varying current pulse generates an electromagnetic force upon the liquid metal that is not sufficient to jet a plurality of liquid metal drops through the nozzle. In certain aspects of the method for metal jetting 1000 the first time varying current pulse and the second time varying current pulse are introduced to the pump simultaneously. In exemplary processes, the first time varying current pulse is conducted at a frequency of from about 300 Hz to about 400 Hz, a pulse width of from about 70 microseconds to about 150 microseconds, and a voltage of from about 150 V to about 200 V. In exemplary processes, the second time varying current pulse is conducted at a frequency of from about 800 Hz to about 4000 Hz, a pulse width of from about 5 microseconds to about 50 microseconds, and a voltage of from about 50 V to about 200 V. In alternate examples, the second time varying current pulse is conducted at a frequency of about 800 Hz and a pulse width of about 50 microseconds. The method for metal jetting 1000 further includes where the second time varying current pulse introduced into the pump provides for a temperature in an upper portion of the pump from about 800° C. to about 850° C., a temperature in a lower portion of the pump from about 800° C. to about 850° C., and a difference between the temperature in an upper portion of the pump and the temperature in a lower portion of the pump is less than 20° C. This is contrasted from when the second time varying current pulse is not introduced into the pump, where the temperatures between the upper and lower pump may differ in an amount from about 70° C. to about 150° C. The second time varying current pulse as described in any of the methods herein may also be referred to as a subthreshold pulse, as it is below a threshold required to initiate a jetting event within an ejector for a metal jetting or MHD printing system.

In certain examples, utilizing the systems and methods disclosed herein, improvements in strength and other physical properties of 3D printed parts may be realized. In addition, jetting improvements may also be an effect, as the jet temperature may be more consistent when jetting is started again after a pause, due to less transients in temperature. Additional benefits of certain examples of the present disclosure include the use of similar hardware, while changing pulse settings using software. In certain examples, lower pulse widths or lower amplitudes may be used, as well as taking advantage of trading off frequency vs. voltage. The methods described herein may be utilized when re-positioning during a printing operation, measuring or evaluating a gap on a particular level, when moving to a new start location, or during a turnaround. In some turnaround operations, a deceleration of the printhead may occur during a move to a subsequent row or section, which can change the printing characteristics due to thermal transients, and compensate for other limitations to decelerations, inefficiencies inherent in the g-code required to print a part, other transitions. Additional benefits of the use of sub-threshold pulsing of the pump in the warm-up, preheat, and standby modes, sub-threshold pulse shape and frequency in providing sufficient induction heating to the lower pump region with negligible meniscus perturbations, and sub-threshold pulses interspersed within consecutive jetting pulses to enable additional heating of drops while jetting may be achieved. These benefits include a reduction or elimination of latency effects at the start of printing, lower thermal gradients and more uniform temperature in the pump, significantly higher drop temperatures at start of printing operations, lower drop temperature transients during printing of a part, lower overall heater power during part building, and the like.

The methods within one or more examples of a 3D metal jetting printing system as described herein, may be conducted with the use of a computer readable medium comprising instructions which, when executed by at least one electronic processor, configure the at least one electronic processor to execute a method for jetting printing material in a printing system as described herein. Certain examples may further include a software or hardware application to allow a user to control the electronic processor. The software application can be, for example, a non-transitory computer readable medium storing instructions, that when executed by a hardware processor, performs a method of providing a graphical user interface on the display to allow a user to control various time varying current pulses to be introduced into a nozzle or pump within a system capable of ejecting printing material. In various examples, a hardware configuration may include the computer readable medium which can be used to perform one or more of the processes described above. The hardware configuration may include any type of mobile devices, such as smart telephones, laptop computers, tablet computers, cellular telephones, personal digital assistants, etc. Further, the hardware configuration can include one or more processors of varying core configurations and clock frequencies. The hardware configuration may also include one or more memory devices that serve as a main memory during operations, calculations, or simulations as described herein. For example, during operation, a copy of the software that supports the above-described operations can be stored in one or more memory devices. One or more peripheral interfaces, such as keyboards, mice, touchpads, computer screens, touchscreens, etc., for enabling human interaction with and manipulation of the hardware configuration may also be included. Exemplary hardware configurations can also include a data bus, one or more storage devices of varying physical dimensions and storage capacities, such as flash drives, hard drives, random access memory, etc., for storing data, such as images, files, and program instructions for execution by the one or more processors. One or more network interfaces for communicating via one or more networks, such as Ethernet adapters, wireless transceivers, or serial network components, for communicating over wired or wireless media using protocols may further be included.

Additionally, hardware configurations in certain embodiments can include one or more software programs that enable the functionality described herein. The one or more software programs can include instructions that cause the one or more processors to perform the processes, functions, and operations described herein related to various time varying current pulses to be introduced into a nozzle or pump within a system capable of ejecting printing material. Copies of the one or more software programs can be stored in the one or more memory devices and/or on in the one or more storage devices. Likewise, the data utilized by one or more software programs can be stored in the one or more memory devices and/or on in the one or more storage devices.

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, or EEPROM. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art. In other embodiments, a non-transitory computer-readable medium may include instructions, that when executed by a hardware processor, causes the hardware processor to perform operations to introduce various time varying current pulses to be into a nozzle or pump within a system capable of ejecting printing material.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A method for metal jetting in a 3D printer, comprising:

heating a liquid metal printing material with a resistive heating element;

introducing a first time varying current pulse using an actuation coil to a pump comprising an inner cavity and a nozzle, wherein:

the inner cavity retains the liquid metal printing material; and the nozzle is configured to jet a plurality of drops therethrough, and wherein the drops comprise liquid metal; and the first time varying current pulse generates an electromagnetic force upon the liquid metal sufficient to jet a plurality of liquid metal drops through the nozzle;

jetting a plurality of liquid metal drops;

pausing the first time varying current pulse;

heating the liquid metal by induction by introducing a second time varying current pulse from the actuation coil to the pump, wherein:

the second time varying current pulse generates an electromagnetic force upon the liquid metal that is not sufficient to jet a plurality of liquid metal drops through the nozzle;

pausing the second time varying current pulse; and resuming the first time varying current pulse.

2. The method for metal jetting in a 3D printer of claim 1, wherein the first time varying current pulse comprises:

a frequency of from about 50 Hz to about 800 Hz;

a pulse width of from about 70 microseconds to about 150 microseconds; and a voltage of from about 150 V to about 200 V.

3. The method for metal jetting in a 3D printer of claim 1, wherein the second time varying current pulse comprises:

a frequency of from about 300 Hz to about 4000 Hz;

a pulse width of from about 5 microseconds to about 150 microseconds; and a voltage of from about 50 V to about 400 V.

4. The method for metal jetting in a 3D printer of claim 3, wherein the second time varying current pulse comprises:

a frequency of about 800 Hz; and a pulse width of about 50 microseconds.

5. The method for metal jetting in a 3D printer of claim 1, wherein when the second time varying current pulse is introduced into the pump:

a temperature in an upper portion of the pump is from about 800° C. to about 850° C.;

a temperature in a lower portion of the pump is from about 800° C. to about 850° C.; and a difference between the temperature in an upper portion of the pump and the temperature in a lower portion of the pump is less than 20° C.

6. The method for metal jetting in a 3D printer of claim 1, wherein when the second time varying current pulse is introduced into the pump:

a temperature in an upper portion of the pump is suitable for melting alloys based on copper, alloys based on iron, alloys based on aluminum, or combinations thereof; and a temperature in a lower portion of the pump is suitable for melting alloys based on copper, alloys based on iron, alloys based on aluminum, or combinations thereof.

7. The method for metal jetting in a 3D printer of claim 1, further comprising initiating a standby mode in the 3D printer prior to introducing the second time varying current pulse to the pump.

8. The method for metal jetting in a 3D printer of claim 1, further comprising initiating a preheat mode in the 3D printer prior to introducing the second time varying current pulse to the pump.

9. The method for metal jetting in a 3D printer of claim 1, further comprising performing a z-scan operation in the 3D printer prior to introducing the second time varying current pulse to the pump.

10. The method for metal jetting in a 3D printer of claim 1, further comprising changing a direction of the nozzle during an operation of printing a 3D part in the 3D printer, spanning a distance between a first structural feature of a 3D part and a second structural feature of a 3D part in a 3D printer, or a combination thereof, prior to introducing the second time varying current pulse to the pump.

11. A method for metal jetting, comprising:

heating a liquid metal printing material with a resistive heating element;

introducing a first time varying current pulse using an actuation coil to a pump comprising an inner cavity and a nozzle, wherein:

the inner cavity retains the liquid metal printing material; and the nozzle is configured to jet a plurality of drops therethrough, and wherein the drops comprise liquid metal; and the first time varying current pulse generates an electromagnetic force upon the liquid metal sufficient to jet a plurality of liquid metal drops through the nozzle;

jetting a plurality of liquid metal drops; and heating the liquid metal by induction using an actuation coil by introducing a second time varying current pulse to the pump, wherein:

the second time varying current pulse generates an electromagnetic force upon the liquid metal that is not sufficient to jet a plurality of liquid metal drops through the nozzle.

12. The method for metal jetting of claim 11, wherein the first time varying current pulse and the second time varying current pulse are introduced to the pump simultaneously.

13. The method for metal jetting of claim 11, wherein the first time varying current pulse comprises:

a frequency of from about 50 Hz to about 800 Hz;

a pulse width of from about 70 microseconds to about 150 microseconds; and a voltage of from about 150 V to about 200 V.

14. The method for metal jetting of claim 11, wherein the second time varying current pulse comprises:

a frequency of from about 300 Hz to about 4000 Hz;

a pulse width of from about 5 microseconds to about 150 microseconds; and a voltage of from about 50 V to about 400 V.

15. The method for metal jetting of claim 14, wherein the second time varying current pulse comprises:

a frequency of about 800 Hz; and a pulse width of about 50 microseconds.

16. The method for metal jetting of claim 11, wherein when the second time varying current pulse is introduced into the pump:

a temperature in an upper portion of the pump is from about 800° C. to about 850° C.;

a temperature in a lower portion of the pump is from about 800° C. to about 850° C.; and a difference between the temperature in an upper portion of the pump and the temperature in a lower portion of the pump is less than 20° C.

17. The method for metal jetting of claim 11, wherein when the second time varying current pulse is introduced into the pump:

a temperature in an upper portion of the pump is suitable for melting alloys based on copper, alloys based on iron, alloys based on aluminum, or combinations thereof; and a temperature in a lower portion of the pump is suitable for melting alloys based on copper, alloys based on iron, alloys based on aluminum, or combinations thereof.

* * * * *